(12) United States Patent
Allain et al.

(10) Patent No.: US 9,695,053 B2
(45) Date of Patent: *Jul. 4, 2017

(54) PROCESS FOR PREPARING PRECIPITATED SILICA HAVING SPECIFIC MORPHOLOGY, PARTICLE SIZE AND POROSITY

(71) Applicant: RHODIA OPERATIONS, Paris (FR)

(72) Inventors: Emmanuelle Allain, L'Hay les Roses (FR); Sylvaine Neveu, Paris (FR)

(73) Assignee: Rhodia Operations, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/373,791

(22) PCT Filed: Jan. 23, 2013

(86) PCT No.: PCT/EP2013/051233
§ 371 (c)(1),
(2) Date: Jul. 22, 2014

(87) PCT Pub. No.: WO2013/110654
PCT Pub. Date: Aug. 1, 2013

(65) Prior Publication Data
US 2015/0030518 A1    Jan. 29, 2015

(30) Foreign Application Priority Data
Jan. 25, 2012  (FR) ...................................... 12 00211

(51) Int. Cl.
C01B 33/12    (2006.01)
C01B 33/193   (2006.01)

(52) U.S. Cl.
CPC .......... *C01B 33/128* (2013.01); *C01B 33/193* (2013.01)

(58) Field of Classification Search
CPC ... C01B 33/128; C01B 33/193; C01P 2004/50
USPC ....................................................... 423/339
See application file for complete search history.

(56) References Cited

U.S. PATENT DOCUMENTS

| | | |
|---|---|---|
| 5,110,574 A | 5/1992 | Reinhardt et al. |
| 5,403,570 A | 4/1995 | Chevallier et al. |
| 5,547,502 A | 8/1996 | Chevallier et al. |
| 5,871,867 A | 2/1999 | Rausch et al. |
| 6,107,226 A * | 8/2000 | Chevallier .................... 501/133 |
| 6,169,135 B1 | 1/2001 | Chevallier et al. |
| 6,869,595 B2 * | 3/2005 | Kostinko et al. ............... 424/49 |
| 2003/0118500 A1* | 6/2003 | Chevallier et al. ........... 423/339 |
| 2004/0062701 A1* | 4/2004 | Valero et al. .................. 423/339 |
| 2005/0032965 A1* | 2/2005 | Valero ........................... 524/493 |
| 2010/0083876 A1* | 4/2010 | Lahary et al. ................ 106/409 |
| 2011/0178227 A1 | 7/2011 | Allain et al. |
| 2013/0171051 A1 | 7/2013 | Clouin et al. |

FOREIGN PATENT DOCUMENTS

| | | |
|---|---|---|
| CN | 102137813 A | 7/2011 |
| EP | 0520862 A1 | 12/1992 |
| EP | 0754650 A1 | 1/1997 |
| JP | H05201719 A | 8/1993 |
| JP | 2004510679 A | 4/2004 |
| JP | 5727605 B2 | 4/2015 |
| WO | WO 95/09127 A1 | 4/1995 |
| WO | 0230818 A2 | 4/2002 |
| WO | WO 2009/112458 A1 | 9/2009 |
| WO | 2010022544 A1 | 3/2010 |
| WO | WO 2011/026893 A1 | 3/2011 |
| WO | WO 2013/092745 A1 | 6/2013 |
| WO | WO 2013/092749 A1 | 6/2013 |
| WO | WO 2013/110655 A1 | 8/2013 |
| WO | WO 2013/110658 A1 | 8/2013 |
| WO | WO 2013/110659 A1 | 8/2013 |

OTHER PUBLICATIONS

U.S. Appl. No. 14/367,425, Clouin et al.
U.S. Appl. No. 14/367,455, Clouin et al.
U.S. Appl. No. 14/373,797, Allain et al.
U.S. Appl. No. 14/373,799, Allain et al.
U.S. Appl. No. 14/373,801, Allain.

* cited by examiner

*Primary Examiner* — Anthony J Zimmer

(57) ABSTRACT

The invention relates to a process for the preparation of precipitated silica formed of aggregates of large primary silica particles, at the surface of which occur small primary silica particles, in which the acid used in at least one of the process steps is a concentrated acid.

9 Claims, No Drawings

PROCESS FOR PREPARING PRECIPITATED SILICA HAVING SPECIFIC MORPHOLOGY, PARTICLE SIZE AND POROSITY

This application is a U.S. national stage entry under 35 U.S.C. §371 of International Application No. PCT/EP2013/051233 filed Jan. 23, 2013, which claims priority to French Application No. 12.00211 filed on Jan. 25, 2012, the whole content of this application being herein incorporated by reference for all purposes.

The present invention relates to a novel process for the preparation of precipitated silica having a specific morphology, a specific particle size and a specific porosity, which is provided in particular in the form of a powder, of substantially spherical beads or of granules.

It is known to employ precipitated silicas as catalyst support, as absorbent for active materials (in particular supports for liquids, for example used in food, such as vitamins (in particular vitamin E) or choline chloride), as viscosifying, texturizing or anticaking agent, as battery separator component, or as additive for toothpaste or for paper.

It is also possible to employ precipitated silicas as reinforcing filler in silicone matrices (for example for covering electrical cables) or in compositions based on natural or synthetic polymer(s), in particular on elastomer(s), especially diene elastomer(s), for example for footwear soles, floor coverings, gas barriers, flame-retardant materials and also engineering components, such as cableway rollers, seals for domestic electrical appliances, seals for liquid or gas pipes, braking system seals, sheathings, cables and transmission belts.

It is thus known, by carrying out a precipitation reaction between a silicate and a dilute acid, to prepare precipitated silicas, which can be used as reinforcing filler for polymer compositions, with atypical characteristics, furthermore providing them with a very satisfactory compromise in properties, in particular in their rheological, mechanical and dynamic properties, especially hysteresis properties.

The aim of the present invention is to provide an alternative to the known processes for the preparation of precipitated silica.

More preferably, one of the aims of the present invention consists in providing a process which, while having an improved productivity, in particular in the precipitation reaction, especially when comparing with preparation processes of the state of the art employing, as acid, a dilute acid, makes it possible to obtain precipitated silicas having similar physicochemical characteristics and properties, especially in their morphology, their particle size and their porosity and/or their reinforcing properties, to those of the precipitated silicas obtained by these state-of-the-art preparation processes.

Another aim of the invention preferably consists, at the same time, in providing a process which makes it possible to reduce the amount of energy consumed and/or the amount of water employed during the preparation of precipitated silica, in particular when comparing with the preparation processes of the state of the art which employ, as acid, a dilute acid.

With these aims in particular, the subject matter of the invention is a novel process for the preparation of precipitated silica comprising the reaction of a silicate with at least one acid, whereby a silica suspension is obtained, and then the separation and the drying of this suspension, in which the reaction of the silicate with the acid is carried out according to the following successive stages:

(i) an aqueous precipitated silica suspension is prepared, exhibiting a pH of between 2.5 and 5.3,
(ii) said aqueous precipitated silica suspension is brought into contact (mixed) with acid and silicate, so that the pH of the reaction medium is maintained between 2.5 and 5.3, in which process:
concentrated acid is used in stage (i)
and/or
the acid added in stage (ii) is concentrated acid, said concentrated acid preferably being selected from the group consisting of sulfuric acid with a concentration of at least 80% by weight, in particular of at least 90% by weight, acetic acid or formic acid with a concentration of at least 90% by weight, nitric acid with a concentration of at least 60% by weight, phosphoric acid with a concentration of at least 75% by weight and hydrochloric acid with a concentration of at least 30% by weight.

Advantageously, the concentrated acid is concentrated sulfuric acid, that is to say sulfuric acid with a concentration of at least 80% by weight, preferably of at least 90% by weight.

Use may thus be made, as concentrated acid, of sulfuric acid having a concentration of at least 1400 g/l, in particular of at least 1650 g/l.

Preferably, the aqueous precipitated silica suspension used in stage (ii) is prepared, in stage (i), in the following way:

(1) an initial stock comprising silicate and an electrolyte is formed, the concentration in silicate (expressed as $SiO_2$) in said initial stock being less than 100 g/l, in particular less than 80 g/l, and, preferably, the electrolyte concentration in said initial stock being less than 19 g/l, in particular less than 18 g/l, especially less than 17 g/l, for example less than 15 g/l (while generally being greater than 6 g/l), (2) acid is added to said stock until a value of the pH of the reaction medium of at least approximately 7, preferably of between 7.5 and 8.5, is obtained, (3) acid and silicate are added simultaneously to the reaction medium, (4) the addition of the silicate is stopped while continuing the addition of the acid to the reaction medium, until a value of the pH of the reaction medium of between 2.5 and 5.3, preferably between 2.8 and 5.2, is obtained.

In this preferred method for the preparation of the aqueous precipitated silica suspension, the initial stock comprises an electrolyte. The term "electrolyte" is understood here as normally accepted, that is to say that it means any ionic or molecular substance which, when it is in solution, decomposes or dissociates to form ions or charged particles. Mention may be made, as electrolyte, of a salt from the group of the salts of alkali metals and alkaline earth metals, in particular the salt of the metal of the starting silicate and of the acid, for example sodium chloride in the case of the reaction of a sodium silicate with hydrochloric acid or, preferably, sodium sulfate in the case of the reaction of a sodium silicate with sulfuric acid.

In stage (1), the electrolyte concentration in the initial stock is greater than 0 g/l, for example greater than 8 g/l.

The simultaneous addition of stage (3) is generally carried out in such a way that the value of the pH of the reaction medium is constantly equal (to within +/−0.2) to that reached on conclusion of stage (2).

On conclusion of stage (4), a maturing of the obtained reaction medium (aqueous suspension) can be carried out, at the pH obtained on conclusion of this stage (4), and in general with stirring, for example for 2 to 45 minutes, in particular for 3 to 30 minutes.

Stages (1) to (4), as in general the entirety of the reaction, are generally carried out with stirring.

All of stages (1), (2), (3) and (4) (and preferably stage (ii) and the optional stage (iii) described below) are usually carried out between 75 and 97° C., preferably between 80 and 96° C.

According to one implementation of the process of the invention, all of the stages are carried out at a constant temperature. According to another implementation of the process of the invention, the temperature at the end of the reaction is higher than the temperature at the start of the reaction: thus, the temperature at the start of the reaction (for example during stages (1) and (2)) is preferably maintained between 75 and 90° C. and then the temperature is increased, preferably up to a value of between 90 and 97° C., at which value it is maintained (for example during stages (3), (4), indeed even (ii) and optionally (iii)), up to the end of the reaction.

In the preparation process of the invention,
an aqueous precipitated silica suspension (which can be a precipitated silica reaction slurry), said suspension with a pH of between 2.5 and 5.3, preferably between 2.8 and 5.2, for example between 3.5 and 5.1 (indeed even between 3.5 and 5.0), is brought into contact (stage (ii)) with acid and silicate,
in such a way (in particular at flow rates such) that the pH of the reaction medium is maintained between 2.5 and 5.3, preferably between 2.8 and 5.2, for example between 3.5 and 5.1 (indeed even between 3.5 and 5.0).

Said pH of the reaction medium can vary within the range 2.5-5.3, preferably the range 2.8-5.2, for example 3.5-5.1 (indeed even 3.5-5.0), or preferably remain (substantially) constant within these ranges.

In general, in this stage (ii), the aqueous suspension is brought into contact with the acid and the silicate by adding acid and silicate to the aqueous precipitated silica suspension.

According to one implementation of the process of the invention, in stage (ii), first the acid and then the silicate are added to the aqueous precipitated silica suspension.

However, according to a preferred implementation of the process of the invention, in stage (ii), the acid and the silicate are instead added simultaneously to the aqueous precipitated silica suspension; preferably, this simultaneous addition is carried out with regulation of the pH of the reaction medium at a (substantially) constant value within the abovementioned ranges.

Stage (ii) is usually carried out with stirring.

It is possible, in an optional subsequent stage (iii), to add, to the reaction medium obtained on conclusion of stage (ii), an alkaline agent, preferably a silicate, this being done until a value of the pH of the reaction medium of between 4.7 and 6.3, preferably between 5.0 and 5.8, for example between 5.0 and 5.4, is reached.

This stage (iii) is usually carried out with stirring.

Stage (ii) and the optional stage (iii) are generally carried out between 75 and 97° C., preferably between 80 and 96° C.

It can be advantageous, on conclusion of stage (ii) or of the optional stage (iii), to carry out a maturing of the obtained reaction medium, in particular at the pH obtained on conclusion of this stage (ii) (or of stage (iii)), generally with stirring. This maturing can, for example, last from 2 to 30 minutes, in particular from 3 to 20 minutes, and can be carried out between 75 and 97° C., preferably between 80 and 96° C., in particular at the temperature at which stage (ii) (or stage (iii)) has been carried out. It preferably comprises neither addition of acid nor addition of silicate.

According to an alternative form (A) of the process of the invention, concentrated acid as defined above is used only in stage (ii).

According to an alternative form (B) of the process of the invention, concentrated acid as defined above is used in stage (i).

However, according to a preferred embodiment of the alternative form (B), concentrated acid as defined above is used in both stages (i) and (ii).

In the case where, on the one hand, concentrated acid as defined above is used only in stage (ii) (alternative form (A)) and, on the other hand, acid is used in stage (i), then the acid employed in stage (i) is a dilute acid, advantageously dilute sulfuric acid, that is to say with a concentration far below 80% by weight, in this case a concentration of less than 20% by weight (and generally of at least 4% by weight), in particular of less than 14% by weight, especially of at most 10% by weight, for example of between 5 and 10% by weight.

According to the alternative form (B) of the process of the invention, concentrated acid is used in stage (i).

According to one embodiment of this alternative form (B) of the process of the invention, the reaction of the silicate with acid is carried out according to the following successive stages:

(i):
(1) an initial stock comprising silicate and an electrolyte is formed, the silicate concentration (expressed as $SiO_2$) in said initial stock being less than 100 g/l, in particular less than 80 g/l, and, preferably, the electrolyte concentration in said initial stock being less than 19 g/l, in particular less than 18 g/l, especially less than 17 g/l, for example less than 15 g/l (while generally being greater than 6 g/l),
(2) acid is added to said stock until a value of the pH of the reaction medium of at least approximately 7, preferably of between 7.5 and 8.5, for example equal to approximately 8, is obtained,
(3) acid and silicate are added simultaneously to the reaction medium, in particular in such a way (in particular at flow rates such) that the pH of the reaction medium is maintained at at least approximately 7, preferably between 7.5 and 8.5, for example at approximately 8,
(4) the addition of the silicate is stopped while continuing the addition of the acid to the reaction medium, until a value of the pH of the reaction medium of between 2.5 and 5.3, preferably between 2.8 and 5.2, for example between 3.5 and 5.1 (indeed even between 3.5 and 5.0), is obtained,
(ii) the aqueous suspension (reaction medium) obtained on conclusion of stage (4) is brought into contact (mixed) with acid and silicate in such a way that the pH of the reaction medium is maintained between 2.5 and 5.3, preferably between 2.8 and 5.2, for example between 3.5 and 5.1 (indeed even between 3.5 and 5.0),
in which process, in at least stage (3), the acid used is a concentrated acid preferably selected from the group consisting of sulfuric acid with a concentration of at least 80% by weight, in particular of at least 90% by weight, acetic acid or formic acid with a concentration of at least 90% by weight, nitric acid with a concentration of at least 60% by weight, phosphoric acid with a concentration of at least 75% by weight and hydrochloric acid with a concentration of at least 30% by weight.

Advantageously, said concentrated acid is concentrated sulfuric acid, that is to say sulfuric acid with a concentration of at least 80% by weight, preferably of at least 90% by weight.

Use may thus be made, as concentrated acid, of sulfuric acid having a concentration of least 1400 g/l, in particular of at least 1650 g/l.

In this embodiment of the alternative form (B), the acid used in stages (2), (4) and (ii) can then be, for example, a dilute acid, advantageously dilute sulfuric acid, that is to say with a concentration far below 80% by weight, in this case a concentration of less than 20% by weight (and in general of at least 4% by weight), in particular of less than 14% by weight, especially of at most 10% by weight, for example of between 5 and 10% by weight.

However, preferably, in this embodiment of the alternative form (B), the acid used in stage (4) is also, as in stage (3), a concentrated acid as mentioned above.

While, within that context, the acid used in the entirety of stage (2) can then be, for example, a dilute acid as described above, it can be advantageous, in one part of this stage (2), in general in a second and last part of this stage (2), for the acid used to also be a concentrated acid as mentioned above (the acid used in the other part of stage (2) being, for example, a dilute acid as described above).

Thus, in this stage (2), the acid employed until the gel point in the reaction medium is reached (corresponding to a sudden increase in the turbidity of the reaction medium characteristic of an increase in size of the objects) can then be a dilute acid as mentioned above, advantageously dilute sulfuric acid (that is to say, with a concentration far below 80% by weight, in this case a concentration of less than 20% by weight, in general of less than 14% by weight, in particular of at most 10% by weight, for example of between 5 and 10% by weight). The acid employed after reaching the gel point in the reaction medium can, for its part, be a concentrated acid as mentioned above, advantageously concentrated sulfuric acid, that is to say sulfuric acid with a concentration of at least 80% by weight, preferably of at least 90% by weight, in particular of between 90 and 98% by weight.

Likewise, in this stage (2), the acid employed in the first x minutes of stage (2), with x between 10 and 25, preferably between 12 and 22, can then be a dilute acid as mentioned above and the acid employed after the first x minutes of stage (2), with x between 10 and 25, preferably between 12 and 22, can be a concentrated acid as mentioned above.

In the context of this embodiment of the alternative form (B), the acid used in the entirety of stage (2) can also be a concentrated acid as mentioned above, advantageously concentrated sulfuric acid, that is to say with a concentration of at least 80% by weight, preferably of at least 90% by weight, in particular of between 90 and 98% by weight. In the case of this use, water can optionally be added to the initial stock, in particular either before stage (2) or during stage (2).

In this embodiment of the alternative form (B), concentrated acid as defined above is used only in stage (i). Use is then made, in stage (ii), of dilute acid, advantageously dilute sulfuric acid, that is to say with a concentration far below 80% by weight, in this case a concentration of less than 20% by weight (and in general of at least 4% by weight), in particular of less than 14% by weight, especially of at most 10% by weight, for example of between 5 and 10% by weight.

However, preferably, in this embodiment of the alternative form (B), concentrated acid as defined above is used in both stages (i) and (ii).

In the process according to the invention, use is generally made, as acid(s) (concentrated acid or dilute acid), of an organic acid, such as acetic acid, formic acid or carbonic acid, or, preferably, of an inorganic acid, such as sulfuric acid, nitric acid, phosphoric acid or hydrochloric acid.

If use is made, as concentrated acid, of concentrated acetic acid or concentrated formic acid, then their concentration is at least 90% by weight.

If use is made, as concentrated acid, of concentrated nitric acid, then its concentration is at least 60% by weight.

If use is made, as concentrated acid, of concentrated phosphoric acid, then its concentration is at least 75% by weight.

If use is made, as concentrated acid, of concentrated hydrochloric acid, then its concentration is at least 30% by weight.

However, very advantageously, use is made, as acid(s), of (a) sulfuric acid(s), the concentrated sulfuric acid then used with a concentration such as already mentioned in the account above.

In general, when concentrated acid is used in several stages, the same concentrated acid is then employed.

Use may furthermore be made, as silicate, of any common form of silicates, such as metasilicates, disilicates and advantageously an alkali metal silicate, in particular sodium or potassium silicate.

The silicate can exhibit a concentration (expressed as $SiO_2$) of between 40 and 330 g/l, for example between 60 and 300 g/l, in particular between 60 and 260 g/l.

Generally, use is made, as silicate, of sodium silicate.

In the case where use is made of sodium silicate, the latter generally exhibits a $SiO_2/Na_2O$ weight ratio of between 2.5 and 4, for example between 3.2 and 3.8.

The alkaline agent employed during the optional stage (iii) can be, for example, a sodium hydroxide, potassium hydroxide or ammonia solution. Preferably, this alkaline agent is silicate, in particular silicate as used during stage (ii).

In the process according to the invention, stage (ii) can be carried out in a rapid mixer or in a region of turbulent flow, which can make possible better control of the characteristics of the obtained precipitated silicas.

For example, in the case where, in stage (ii), first the acid and then the silicate are added to the aqueous precipitated silica suspension, then said silicate can be brought into contact with the medium resulting from the addition of the acid to the aqueous precipitated silica suspension in a rapid mixer or in a region of turbulent flow.

Likewise, in the case where, in stage (ii), the acid and the silicate are added simultaneously to the aqueous precipitated silica suspension, then said acid and said silicate can be brought into contact with the aqueous precipitated silica suspension in a rapid mixer or in a region of turbulent flow.

Preferably, the reaction medium obtained in the rapid mixer or in a region of turbulent flow feeds a reactor, preferably subjected to stirring, in which reactor stage (iii) is subsequently carried out.

In stage (ii), use may be made of a rapid mixer selected from symmetrical T- or Y-mixers (or tubes), asymmetrical T- or Y-mixers (or tubes), tangential jet mixers, Hartridge-Roughton mixers, vortex mixers or rotor-stator mixers.

Symmetrical T- or Y-mixers (or tubes) are generally composed of two opposing tubes (T-tubes) or two tubes forming an angle of less than 180° (Y-tubes), with the same diameter, discharging into a central tube, the diameter of which is identical to or greater than that of the two preceding tubes. They are said to be "symmetrical" because the two tubes for injecting the reactants exhibit the same diameter and the same angle with respect to the central tube, the device being characterized by an axis of symmetry. Preferably, the central tube exhibits a diameter two times greater approximately than the diameter of the opposing tubes; likewise, the fluid velocity in the central tube is preferably equal to half that in the opposing tubes.

However, it is preferable to employ, in particular when the two fluids to be introduced do not exhibit the same flow rate, an asymmetrical T- or Y-mixer (or tube) rather than a symmetrical T- or Y-mixer (or tube). In the asymmetrical devices, one of the fluids (generally the fluid with the lower flow rate) is injected into the central tube by means of a side tube of smaller diameter. The latter forms an angle generally of 90° with the central tube (T-tube); this angle can be different from 90° (Y-tube), giving cocurrent systems (for example, angle of 45°) or countercurrent systems (for example, angle of 135°), with respect to the other stream.

Use is preferably made, as rapid mixer, of a tangential jet mixer, a Hartridge-Roughton mixer or a vortex mixer (or precipitator), which derive from symmetrical T devices.

More particularly, in stage (ii), use may be made of a tangential jet, Hartridge-Roughton or vortex rapid mixer comprising a chamber having (a) at least two tangential admissions via which either, on the one hand, the silicate and, on the other hand, the medium resulting from the addition of acid to the aqueous precipitated silica suspension or, on the one hand, the silicate and the acid and, on the other hand, the aqueous precipitated silica suspension enter separately (but at the same time) and (b) an axial outlet via which the reaction medium exits, preferably toward a reactor (vessel) positioned in series after said mixer. The two tangential admissions are preferably situated symmetrically and in opposing fashion with respect to the central axis of said chamber.

The chamber of the tangential jet, Hartridge-Roughton or vortex mixer optionally used generally exhibits a circular cross-section and is preferably cylindrical in shape.

Each tangential admission tube can exhibit an internal diameter d from 0.5 to 80 mm.

This internal diameter d can be between 0.5 and 10 mm, in particular between 1 and 9 mm, for example between 2 and 7 mm. However, in particular on the industrial scale, it is preferably between 10 and 80 mm, in particular between 20 and 60 mm, for example between 30 and 50 mm.

The internal diameter of the chamber of the tangential jet, Hartridge-Roughton or vortex mixer optionally employed can be between 3 d and 6 d, in particular between 3 d and 5 d, for example equal to 4 d; the internal diameter of the axial outlet tube can be between 1 d and 3 d, in particular between 1.5 d and 2.5 d, for example equal to 2 d.

The silicate and acid flow rates are, for example, determined so that, at the point of confluence, the two streams of reactants come into contact with one another in a region of sufficiently turbulent flow.

In the process according to the invention, on conclusion of stage (ii) or optionally of stage (iii), if appropriate followed by a maturing, a silica slurry is obtained and is subsequently separated (liquid/solid separation).

The separation carried out in the preparation process according to the invention usually comprises a filtration, followed by a washing operation, if necessary. The filtration is carried out according to any suitable method, for example using a filter press, a belt filter or a vacuum filter.

The silica suspension thus recovered (filtration cake) is subsequently dried.

This drying operation can be carried out according to any means known per se.

Preferably, the drying operation is carried out by atomization. To this end, use may be made of any type of suitable atomizer, in particular a rotary, nozzle, liquid pressure or two-fluid atomizer. Generally, when the filtration is carried out using a filter press, a nozzle atomizer is used and, when the filtration is carried out using a vacuum filter, a rotary atomizer is used.

It should be noted that the filtration cake is not always under conditions which make possible atomization, in particular because of its high viscosity. In a way known per se, the cake is then subjected to a liquefaction operation. This operation can be carried out mechanically, by passing the cake into a mill of colloid or bead type. Liquefaction is generally carried out in the presence of an aluminum compound, in particular of sodium aluminate, and optionally in the presence of an acid, such as described above (in the latter case, the aluminum compound and the acid are generally added simultaneously). The liquefaction operation makes it possible in particular to lower the viscosity of the suspension to be subsequently dried.

When the drying operation is carried out using a nozzle atomizer, the silica capable of being then obtained usually exists in the form of substantially spherical beads.

On conclusion of the drying operation, the product recovered can then be subjected to a milling stage. The silica which is then capable of being obtained generally exists in the form of a powder.

When the drying operation is carried out using a rotary atomizer, the silica capable of being then obtained can exist in the form of a powder.

Finally, the product, dried (in particular by a rotary atomizer) or milled as indicated above, can optionally be subjected to an agglomeration stage which comprises, for example, a direct compression, a wet granulation (that is to say, with the use of a binder, such as water, silica suspension, and the like), an extrusion or, preferably, a dry compacting. When the latter technique is employed, it may prove to be advisable, before carrying out the compacting, to deaerate (operation also referred to as predensifying or degassing) the pulverulent products so as to remove the air included in the latter and to provide more uniform compacting.

The silica capable of being then obtained by this agglomeration stage generally exists in the form of granules.

The silica powders, as well as the silica beads, obtained by the process according to the invention thus offer the advantage, inter alia, of providing access, in a simple, effective and economical way, to granules, in particular by conventional shaping operations, such as, for example, a granulation or a compacting, without the latter operations causing damage capable of obscuring, indeed even destroying, the good properties intrinsically attached to these powders or these beads.

Generally, the process according to the invention makes it possible to obtain silicas formed of aggregates of large primary silica particles, at the surface of which occur small primary silica particles, advantageously exhibiting the characteristics of the silicas described in the international application WO 2009/112458.

The implementation of the preparation process according to the invention, particularly when the concentrated acid used is concentrated sulfuric acid, makes it possible in particular to obtain, during said process (on conclusion of stage (ii) or of the optional stage (iii)), a suspension which is more concentrated in precipitated silica than that obtained by an identical process using only dilute acid and thus to obtain a gain in productivity of precipitated silica (which can reach, for example, at least 10 to 40%), in particular in the precipitation reaction (that is to say, on conclusion of stage (ii)), while being accompanied, surprisingly, by the production of precipitated silica having a good ability to disperse (dispersibility) in polymer (elastomer) compositions; more generally, the precipitated silicas obtained by the process according to the invention exhibit a specific morphology, a specific particle size and a specific porosity; in addition, they generally exhibits a good ability to disperse (dispersibility) in polymers. They confer, on these, a highly satisfactory compromise in properties, in particular in their mechanical, dynamic and rheological properties, which are comparable to those of the precipitated silicas obtained by an identical process using only dilute acid. They also make it possible advantageously to obtain a good reinforcing/hysteresis properties compromise.

Advantageously, at the same time, in particular when the concentrated acid used is concentrated sulfuric acid, the process according to the invention makes possible, in comparison with an identical process employing only dilute acid, a saving (which can reach, for example, at least 20 to 60%) in the consumption of energy (in the form of live steam, for example), in particular in the precipitation reaction (that is to say, on conclusion of stage (ii)), due to a reduction in the amounts of water involved and the exothermicity related to the use of concentrated acid. Moreover, the use of concentrated acid makes it possible to cut down (for example by at least 20%) on the amount of water needed for the reaction, in particular due to the reduction in the amount of water used for the preparation of the acid.

The precipitated silicas prepared by the process according to the invention can be used in numerous applications.

They can be employed, for example, as catalyst support, as absorbent for active materials (in particular support for liquids, especially used in food, such as vitamins (vitamin E) or choline chloride), in polymer, especially elastomer, or silicone compositions, as viscosifying, texturizing or anti-caking agent, as battery separator component, or as additive for toothpaste, concrete or paper.

However, they find a particularly advantageous application in the reinforcement of natural or synthetic polymers.

The polymer compositions in which they can be used, in particular as reinforcing filler, are generally based on one or more polymers or copolymers, especially on one or more elastomers, in particular thermoplastic elastomers, preferably with at least one glass transition temperature between −150° C. and +300° C., for example between −150° C. and +20° C.

Mention may be made, as possible polymers, of diene polymers, in particular diene elastomers.

Mention may be made, as non-limiting examples of finished articles based on the polymer compositions described above, of footwear soles, tires, floor coverings, gas barriers, flame-retardant materials and also engineering components, such as cableway rollers, seals for domestic electrical appliances, seals for liquid or gas pipes, braking system seals, sheathings (especially cable sheathings), cables, engine supports, conveyor belts and transmission belts.

The following examples illustrate the invention without, however, limiting the scope thereof.

EXAMPLE 1 (COMPARATIVE)

The following are introduced into a 25-liter stainless steel reactor equipped with a system for stirring by propellers and with heating via a jacket:

7.91 liters of municipal water,
4285 grams of aqueous sodium silicate, with a $SiO_2/Na_2O$ weight ratio equal to 3.55+/−0.12 and having a concentration equal to 235 g/l,
134 grams of sodium sulfate $Na_2SO_4$ (electrolyte).

The silicate concentration (expressed as $SiO_2$) in the stock is then 72 g/l.

The mixture is homogenized by stirring and brought to 95° C. The entire reaction is carried out with stirring (300 rev/min, propeller stirring).

Sulfuric acid with a concentration equal to 80 g/l is introduced into the mixture over 15 minutes at a flow rate of 146 g/min (i.e., 2192 grams of sulfuric acid). Sulfuric acid with a concentration equal to 80 g/l is subsequently introduced into the mixture over approximately 5 minutes at a flow rate of 438 g/min (i.e., 2153 grams of sulfuric acid).

Once acidification is complete, the simultaneous introduction is carried out, into the reaction medium, over 10 minutes, of a sodium silicate solution (with a $SiO_2/Na_2O$ weight ratio equal to 3.55+/−0.12 and with a density d20 equal to 1.230+/−0.006) having a concentration of 235 g/l, at a flow rate of 80 g/min, and sulfuric acid with a concentration equal to 80 g/l, at a flow rate regulated so as to maintain the pH of the reaction medium at a value of 8.

At the end of the 10 minutes of simultaneous addition, sulfuric acid with a concentration equal to 80 g/l is introduced at a flow rate of 80 g/min until the pH of the reaction medium reaches a value of 4.7 (i.e., 414 grams of sulfuric acid in 5 minutes).

The simultaneous introduction is subsequently carried out, into the reaction medium, over 29 minutes, of a sodium silicate solution (with a $SiO_2/Na_2O$ weight ratio equal to 3.55+/−0.12 and with a density d20 equal to 1.230+/−0.006) having a concentration of 235 g/l, at a flow rate of 60 g/min, and sulfuric acid with a concentration equal to 80 g/l, at a flow rate regulated so as to maintain the pH of the reaction medium at a value of 4.7.

On conclusion of the reaction, a precipitated silica reaction slurry is obtained and is kept stirred at a temperature of 95° C. for 5 minutes. After this maturing, the precipitated silica slurry is recovered by emptying the reactor.

The slurry is filtered and washed under vacuum. The obtained filtration cake is washed 4 times with 5 liters of municipal water. It is subsequently resuspended by mechanical liquefaction in the presence of water and sodium aluminate ($Al/SiO_2$ weight ratio of 0.3%). The resulting slurry (solids content of 10% by weight) is subsequently dried by atomization using a rotary atomizer.

The characteristics of the precipitated silica obtained in the powder form are then as follows:

CTAB specific surface: 158 m²/g
Median size d50 of aggregates: 98 nm
$V_{(d5-d50)}/V_{(d5-d100)}$: 0.83
Mode (Hg porosimetry): 33 nm It is found, in particular by TEM, that the precipitated silica is formed of aggregates of large primary silica particles (lpp), at the surface of which occur small primary silica particles (spp).

EXAMPLE 2

The following are introduced into a 25-liter stainless steel reactor equipped with a system for stirring by propellers and with heating via a jacket:

7.91 liters of municipal water, 4286 grams of aqueous sodium silicate, with a $SiO_2/Na_2O$ weight ratio equal to 3.55+/−0.12 and a density d20 equal to 1.230+/−0.006 and having a concentration of 235 g/l, 134 grams of sodium sulfate $Na_2SO_4$ (electrolyte).

The silicate concentration (expressed as $SiO_2$) in the stock is then 72 g/l.

The mixture is homogenized by stirring and brought to 95° C. The entire reaction is carried out with stirring (300 rev/min, propeller stirring).

Sulfuric acid with a concentration equal to 80 g/l is introduced into the mixture over 14 minutes at a flow rate of 157.8 g/min (i.e., 2191 grams of sulfuric acid). 95% Sulfuric acid is subsequently introduced into the mixture until the pH of the reaction medium reaches a value of 8 (i.e., 34.5 grams of 95% sulfuric acid in 5 minutes).

Once acidification is complete, the simultaneous introduction is carried out, into the reaction medium, over 10 minutes, of a sodium silicate solution (with a $SiO_2/Na_2O$ weight ratio equal to 3.55+/−0.12 and with a density d20 equal to 1.230+/−0.006) having a concentration of 235 g/l, at a flow rate of 80 g/min, and 95% sulfuric acid, at a flow rate regulated so as to maintain the pH of the reaction medium at a value of 8.

At the end of the 10 minutes of simultaneous addition, 95% sulfuric acid is introduced until the pH of the reaction medium reaches a value of 4.8 (i.e., 30 grams of sulfuric acid in approximately 8 minutes).

The simultaneous introduction is subsequently carried out, into the reaction medium, over 27 minutes, of a sodium silicate solution (with a $SiO_2/Na_2O$ weight ratio equal to 3.55+/−0.12 and with a density d20 equal to 1.230+/−0.006) having a concentration of 235 g/l, at a flow rate of 62.8 g/min, and 95% sulfuric acid, at a flow rate regulated so as to maintain the pH of the reaction medium at a value of 4.8.

On conclusion of the reaction, a precipitated silica reaction slurry is obtained and is kept stirred at a temperature of 95° C. for 5 minutes. After this maturing, the precipitated silica slurry is recovered by emptying the reactor.

The slurry is filtered and washed under vacuum. The obtained filtration cake is washed 4 times with 5 liters of municipal water. It is subsequently resuspended by mechanical liquefaction in the presence of water and sodium aluminate (Al/$SiO_2$ weight ratio of 0.3%). The resulting slurry (solids content of 10% by weight) is subsequently dried by atomization using a rotary atomizer.

In comparison with example 1, the following are found:
a gain in productivity in the reaction (regarding the final concentration, expressed as $SiO_2$, of the reaction medium and taking into account the duration of the reaction) of 28%,
a saving in water consumption in the reaction of 25%,
a saving in energy consumption in the reaction of 28%.

The characteristics of the precipitated silica obtained in the powder form are then as follows:
CTAB specific surface: 173 m²/g
Median size d50 of aggregates: 101 nm
$V_{(d5-d50)}/V_{(d5-d100)}$: 0.84
Mode (Hg porosimetry): 28 nm It is found, in particular by TEM, that the precipitated silica is formed of aggregates of large primary silica particles (lpp), at the surface of which occur small primary silica particles (spp).

EXAMPLE 3

The following are introduced into a 25-liter stainless steel reactor equipped with a system for stirring by propellers and with heating via a jacket:

9.93 liters of municipal water,
4286 grams of aqueous sodium silicate, with a $SiO_2/Na_2O$ weight ratio equal to 3.55+/−0.12 and having a concentration equal to 235 g/l,
134 grams of sodium sulfate $Na_2SO_4$ (electrolyte).

The silicate concentration (expressed as $SiO_2$) in the stock is then 61 g/l.

The mixture is homogenized by stirring and brought to 95° C. The entire reaction is carried out with stirring (300 rev/min, propeller stirring).

95% Sulfuric acid (with a density d20 equal to 1.65) is introduced into the mixture over 15 minutes at a flow rate of 10.33 g/min. 95% Sulfuric acid is subsequently introduced into the mixture until the pH of the reaction medium reaches a value of 8 (i.e., 195 grams of sulfuric acid in 5 minutes).

Once acidification is complete, the simultaneous introduction is carried out, into the reaction medium, over 10 minutes, of a sodium silicate solution (with a $SiO_2/Na_2O$ weight ratio equal to 3.55+/−0.12 and with a density d20 equal to 1.230+/−0.006) having a concentration of 235 g/l, at a flow rate of 80 g/min, and 95% sulfuric acid, at a flow rate regulated so as to maintain the pH of the reaction medium at a value of 8.

At the end of the 10 minutes of simultaneous addition, 95% sulfuric acid is introduced until the pH of the reaction medium reaches a value of 4.8 (i.e., 29.6 grams of sulfuric acid in 7 minutes).

The simultaneous introduction is subsequently carried out, into the reaction medium, over 27 minutes, of a sodium silicate solution (with a $SiO_2/Na_2O$ weight ratio equal to 3.55+/−0.12 and with a density d20 equal to 1.230+/−0.006) having a concentration of 235 g/l, at a flow rate of 62.8 g/min, and 95% sulfuric acid, at a flow rate regulated so as to maintain the pH of the reaction medium at a value of 4.8.

On conclusion of the reaction, a precipitated silica reaction slurry is obtained and is kept stirred at a temperature of 95° C. for 5 minutes. After this maturing, the precipitated silica slurry is recovered by emptying the reactor.

The slurry is filtered and washed under vacuum. The obtained filtration cake is washed 4 times with 5 liters of municipal water. It is subsequently resuspended by mechanical liquefaction in the presence of water and sodium aluminate (Al/$SiO_2$ weight ratio of 0.3%). The resulting slurry (solids content of 10% by weight) is subsequently dried by atomization using a rotary atomizer.

Compared to example 1, the following are observed:
a gain in productivity in the reaction (regarding the final concentration, expressed as $SiO_2$, of the reaction medium and taking into account the duration of the reaction) of 28%,
a saving in water consumption in the reaction of 25%,
a saving in energy consumption in the reaction of 26%.

The characteristics of the precipitated silica obtained in the powder form are then as follows:
CTAB specific surface: 147 m²/g
Median size d50 of aggregates: 100 nm
$V_{(d5-d50)}/V_{(d5-d100)}$: 0.84
Mode (Hg porosimetry): 31 nm It is found, in particular by TEM, that the precipitated silica is formed of aggregates of large primary silica particles (lpp), at the surface of which occur small primary silica particles (spp).

The invention claimed is:
1. A process for preparing precipitated silica, the process comprising:
reacting-a silicate with at least one acid using the following steps, whereby a silica suspension is obtained:

(i) preparing an aqueous precipitated silica suspension
  (1) forming an initial stock comprising a silicate and an electrolyte, the silicate concentration expressed as $SiO_2$ in said initial stock being less than 100 g/l and, the electrolyte concentration in said initial stock being less than 19 g/l,
  (2) adding an acid to said stock to form a reaction medium until a value of the pH of the reaction medium of at least approximately 7 is obtained,
  (3) simultaneously adding an acid and a silicate to the reaction medium, and
  (4) stopping the addition of the silicate used in step (3) while continuing the addition of an acid to the reaction medium, until a value of the pH of the reaction medium of between 2.5 and 5.3 is obtained,
whereby an aqueous precipitated silica suspension exhibiting a pH of between 2.5 and 5.3 is obtained, and
(ii) bringing said aqueous precipitated silica suspension into contact with an acid and a silicate to form a reaction medium, so that the pH of the reaction medium is maintained between 2.5 and 5.3,
  separating precipitate from the silica suspension; and
  drying the precipitate,
wherein step (2) comprises adding, for x minutes, a dilute acid followed by adding, after x minutes, a concentrated acid, wherein x is between 10 and 25,
wherein said concentrated acid is selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

2. The process according to claim 1, wherein, after the aqueous precipitated silica suspension is brought into contact with said acid and said silicate used in step (ii), an alkaline agent is added to the reaction medium, so as to increase the pH of the reaction medium up to a value of between 4.7 and 6.3.

3. The process according to claim 1, wherein the acid used in said step (ii) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

4. The process according to claim 1, wherein the acid used in step (3) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

5. The process according to claim 4, wherein the acid used in said steps (3) and (4) is a concentrated acid selected from the group consisting of sulfuric acid with a concentration of at least 80% by weight, acetic acid with a concentration of at least 90% by weight, formic acid with a concentration of at least 90% by weight, nitric acid with a concentration of at least 60% by weight, phosphoric acid with a concentration of at least 75% by weight, and hydrochloric acid with a concentration of at least 30% by weight.

6. The process according to claim 1, wherein in said step (2), the concentrated acid is added after reaching a gel point in the reaction medium.

7. The process according to claim 1, wherein said concentrated acid is sulfuric acid with a concentration of at least 80% by weight.

8. The process according to claim 1, wherein said concentrated acid is sulfuric acid with a concentration of between 90 and 98% by weight.

9. The process according to claim 1, wherein said drying is carried out by atomization.

\* \* \* \* \*